United States Patent [19]

Ishikawa

[11] Patent Number: 5,644,445
[45] Date of Patent: Jul. 1, 1997

[54] CARTRIDGE LIBRARY APPARATUS

[75] Inventor: Masatoshi Ishikawa, Odawara, Japan

[73] Assignee: Hitachi Ltd., Tokyo, Japan

[21] Appl. No.: 307,346

[22] Filed: Sep. 9, 1994

Related U.S. Application Data

[63] Continuation of Ser. No. 998,472, Dec. 30, 1992, abandoned.

[30] Foreign Application Priority Data

Jan. 9, 1992 [JP] Japan ............... 4-002040

[51] Int. Cl.⁶ .......................... G11B 15/18
[52] U.S. Cl. ........................... 360/71; 360/92
[58] Field of Search ............... 360/69, 71, 92, 360/96.5, 96.6; 369/36, 38, 191, 194, 270; 414/280

[56] References Cited

U.S. PATENT DOCUMENTS

| | | | |
|---|---|---|---|
| 4,654,727 | 3/1987 | Blum et al. | 360/71 |
| 4,779,151 | 10/1988 | Lind et al. | 360/69 X |
| 5,231,552 | 7/1993 | Schneider et al. | 360/92 |
| 5,247,406 | 9/1993 | Apple et al. | 360/92 |
| 5,274,516 | 12/1993 | Kakuta et al. | 360/92 |
| 5,293,284 | 3/1994 | Sato et al. | 360/92 |

FOREIGN PATENT DOCUMENTS 56-80847  7/1981  Japan .

*Primary Examiner*—Andrew L. Sniezek
*Attorney, Agent, or Firm*—Meltzer, Lippe, Goldstein et al.

[57] ABSTRACT

A cartridge library apparatus that is capable of reducing the workload of an operator who has to handle a high volume of cartridges. The apparatus comprises racks for accommodating a plurality of cartridges, a transport mechanism for transporting cartridges both between a magnetic tape drive unit for reading information from the cartridges and a rack and between individual racks, and a magazine capable of accommodating a plurality of cartridges. Part of the racks compose a magazine rack which is capable of accommodating the magazine in such a way that it can be loaded from the outside or unloaded from within the apparatus, whereas the other part of the racks compose main racks that accommodate the cartridges when they are not stacked in the magazine.

11 Claims, 5 Drawing Sheets

CARTRIDGE LIBRARY APPARATUS

This is a continuation of application Ser. No. 07/998,472, filed Dec. 30, 1992 now abandoned.

BACKGROUND OF THE INVENTION

1. Field of the Invention

The present invention relates to a cartridge library apparatus suitable for use in handling a number of cartridges of magnetic tape in one operation.

2. Related Art

While various kinds of external memory sub-systems are known for implementation in information processing systems such as general-purpose electronic computer systems, a typical example is a cartridge library apparatus that comprises racks accommodating a number of cartridges of magnetic tape (which are hereunder sometimes referred to simply as "cartridges"), a magnetic tape drive unit and a transport mechanism such as an accessor robot for performing necessary jobs such as transport of cartridges between one of those racks and the drive unit and which is capable of providing a large storage capacity.

An example of the means for enabling cartridges to be either unloaded from the cartridge library apparatus or loaded thereinto is described in Unexamined Published Japanese Patent Application No. 80847/1981. The cartridge transfer mechanism described in that patent comprises a disk-shaped member that has one side facing racks and the other side exposed to the outside, with a plurality of cartridge-accommodating cylinders being arranged rotatably and radially on the disk-shaped member. With the aid of those cylinders, the cartridges can individually be loaded onto or unloaded from the racks.

The user of the prior art library apparatus is capable of loading it with only one cartridge at a time and when loading a high volume of cartridges into the apparatus or unloading them for such purposes as processing files on a monthly or yearly basis, the user has to be involved so many times in getting the job done that not only does his workload increase but also the time required to complete the job will be prolonged.

SUMMARY OF THE INVENTION

An object, therefore, of the present invention is to provide a cartridge library apparatus that enables a number of cartridges to be loaded or unloaded at a time, thereby reducing the workload of the operator who is handling many cartridges.

A typical embodiment of the present invention is briefly described below.

The present invention provides a cartridge library apparatus that comprises racks for storing a plurality of cartridges of magnetic tape in stacks and a transport mechanism that will slide along those racks and which will perform selective transfer of cartridges of magnetic tape between each one of those racks and a magnetic tape drive unit or the like. The apparatus is characterized in that part of the racks is composed of portable magazines that can be loaded from the outside or unloaded from the racks or transported as they accommodate a plurality of cartridges of magnetic tape while the transport mechanism is adapted to have direct access to the cartridges of magnetic tape put in the magazines.

The above-described cartridge library apparatus of the present invention insures that in the case of handling a high volume of cartridges for such purposes as processing files on a monthly or yearly basis, the operator is capable of loading the group of cartridges into the apparatus or unloading them from it in one operation as they are put in magazines. Hence, there is no need to repeat the step of loading and unloading a number of cartridges individually and, as a result, not only can the workload of the operator be reduced markedly but also the time required to complete the job is shortened.

EMBODIMENT OF THE INVENTION

An embodiment of the cartridge library apparatus of the present invention is described below with reference to the accompanying drawings.

Figure 1:
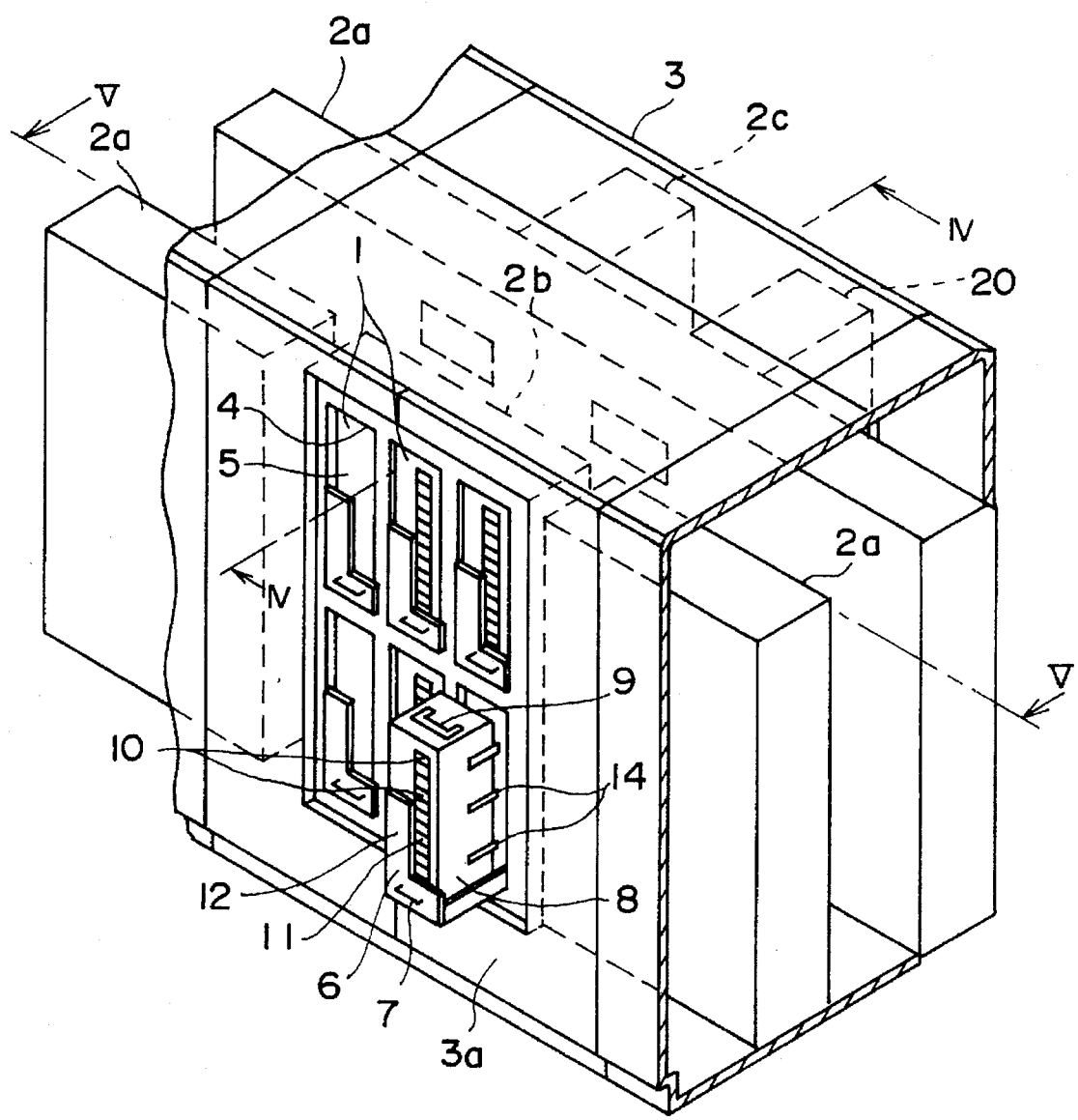
FIG. 1 is a perspective view, with part taken away, of a cartridge library apparatus according to an embodiment of the present invention.
Figure 4:
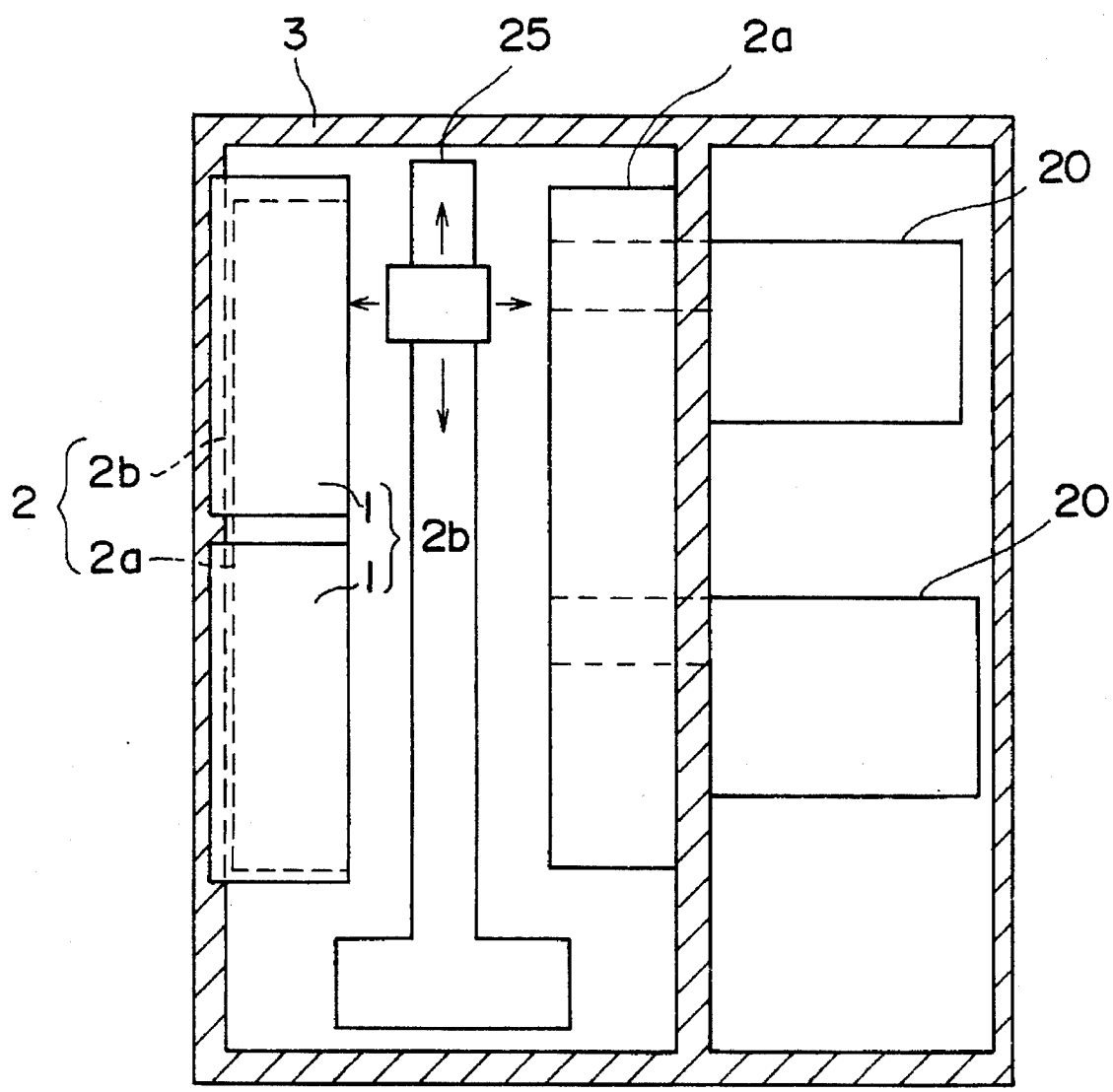
FIG. 4 is a cross section of FIG. 1 as taken on line VI—VI.

As shown in FIG. 4, the cartridge library apparatus of the present invention comprises racks 2 for accommodating a plurality of cartridges, a magnetic tape drive unit 20 having a plurality of magnetic tape drive portions, a transport mechanism 25 for transporting a cartridge 10 (see FIG. 1) between one of the racks 2 and the magnetic tape drive unit 20, a control (not shown) for performing control over the operation of the transport mechanism 25, and a housing 3 covering those parts.

Figure 5:
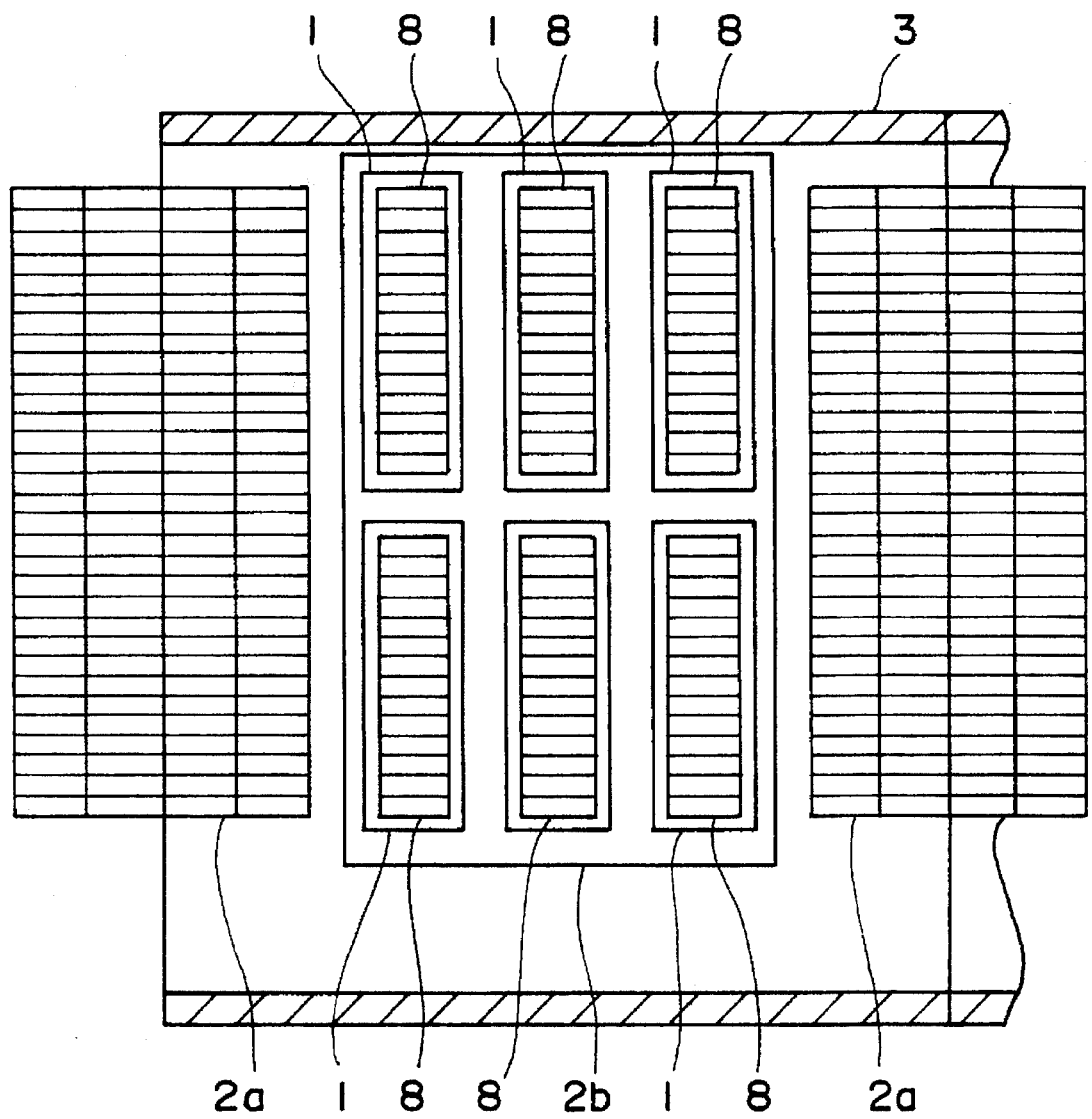
FIG. 5 is a cross section of FIG. 1 as taken on line V—V.

Racks 2 consist of two groups as shown in FIG. 5. The first group comprises a magazine rack 2b, or a rack that accommodates magazines 8 that permit a plurality of cartridges 10 to be stacked in two rows, upper and lower. The second group comprises main racks 2a that accommodate cartridges 10 as they are not stacked in magazines 8. The magazine rack 2b is disposed in the center of the front side of the housing 3 whereas the main racks 2a are disposed on both sides of the magazine rack 2b. The magazine rack 2b is capable of accommodating six magazines 8, three in each of the upper and lower rows. In other words, the rack 2b has six magazine accommodating portions 1 through which magazines 8 can be inserted from the front to the rear side of the housing 3.

The housing 3 has a door 3a in the front face which has six openings 4 that are formed in alignment with the positions of the magazine accommodating portions 1 and through which magazines 8 can be inserted. The openings 4 are individually closed with a safety cover 5 so that an operator's hand (not shown) or the like cannot reach into the apparatus when it is not in use.

A sliding drawer 6 that can be moved toward or away from the operator is provided within each magazine accommodating portion 1 and magazines 8 can be put in that drawer 6 if it is pulled toward the operator (out of the housing 3).

The top of each magazine 8 is equipped with a handle 9 that can be brought to an erect position so that it provides ease of handling for the operator when he transports or puts magazines in the sliding drawer 6. The sliding drawer 6 is also equipped with a handle 7 on the side exterior to the housing and this handle provides ease of sliding the drawer 6 toward or away from the operator.

Figure 2:
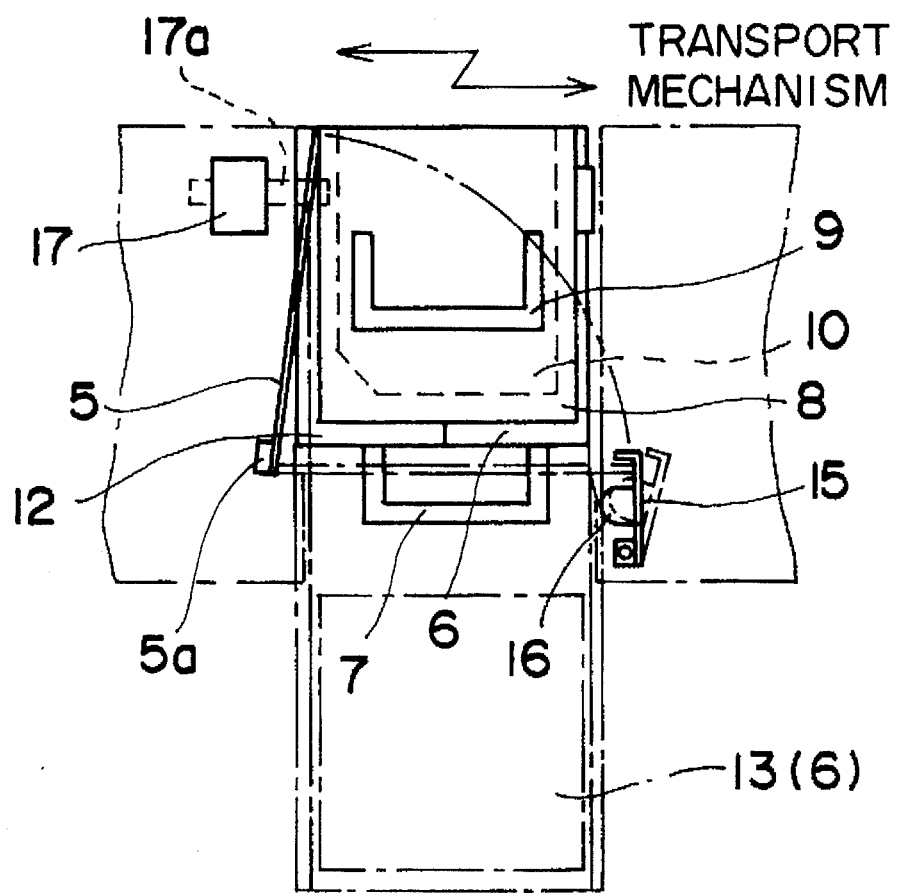
FIG. 2 is a diagram illustrating the structure of the magazine accommodating portion of the apparatus according to the embodiment shown in FIG. 1.

FIG. 2 shows an example of the internal structure of each magazine accommodating portion 1 into which an individual magazine 8 is to be loaded or from which it is to be unloaded. The sliding drawer 6, when it is pulled out of the housing 3, is in the position indicated by 13 (the one-long-and-one-short dashed line) so that magazine 8 can be slid down into the portion 1 from the right side without being interfered with by a bracket 12 provided on the front side of the magazine which, in the condition shown, is securely fixed with respect to the sliding drawer 6 in both horizontal and vertical directions. The bracket 12 is of such dimensions and shape that it covers the magazine 8 up to the position of its center of gravity. Hence, when the magazine 8 carried in the sliding drawer 6 is to be accessed by the transport mechanism 25 as the magazine is loaded within the apparatus, it can be maintained in the stable upright position even if a push is exerted by the transport mechanism 25 toward the outside of the apparatus.

Each magazine 8 is also equipped on the front side with a transparent cover 11 through which the operator can see the plurality of cartridges 10 loaded in the magazine. The rear side of each magazine which faces the transport mechanism 25 has an opening (not shown) through which cartridges 10 can be withdrawn by that mechanism 25.

As shown in FIG. 5, cartridges 10 in each magazine are stacked on the same pitch as cartridges 10 in each of the main racks 2a adjacent to the magazine rack 2b. Further, as shown in FIG. 4, the magazine rack 2b is so composed that the side to be accessed by the transport mechanism 25 lies in the same plane as the side of each main rack 2a where it is to be accessed by the transport mechanism. This features insures that cartridges 10 in each of the magazines 8 stacked in the magazine rack 2b and those in the main racks 2a can equally be handled by the transport mechanism 25 without the need of making any particular distinction and, as a result, the operation of the transport mechanism can be controlled in an easy way.

The safety cover 5 can be pushed open through the opening 4 by turning on the center 5a that is disposed at one end of the cover and which is supported by the housing 3. The door is normally closed by being urged toward the operator (to the outside of the apparatus) under the force of an urging means such as a spring (not shown). The other end face of the safety cover which is opposite the center of turning 5a is in engagement with a latch 15 that is disposed in more than one location along the height of the door and which is to be displaced in operative association with a cam 16; because of this construction, the door will not readily open if an external force is applied in the absence of magazines 8 in the accommodating portions 1.

Figure 3:
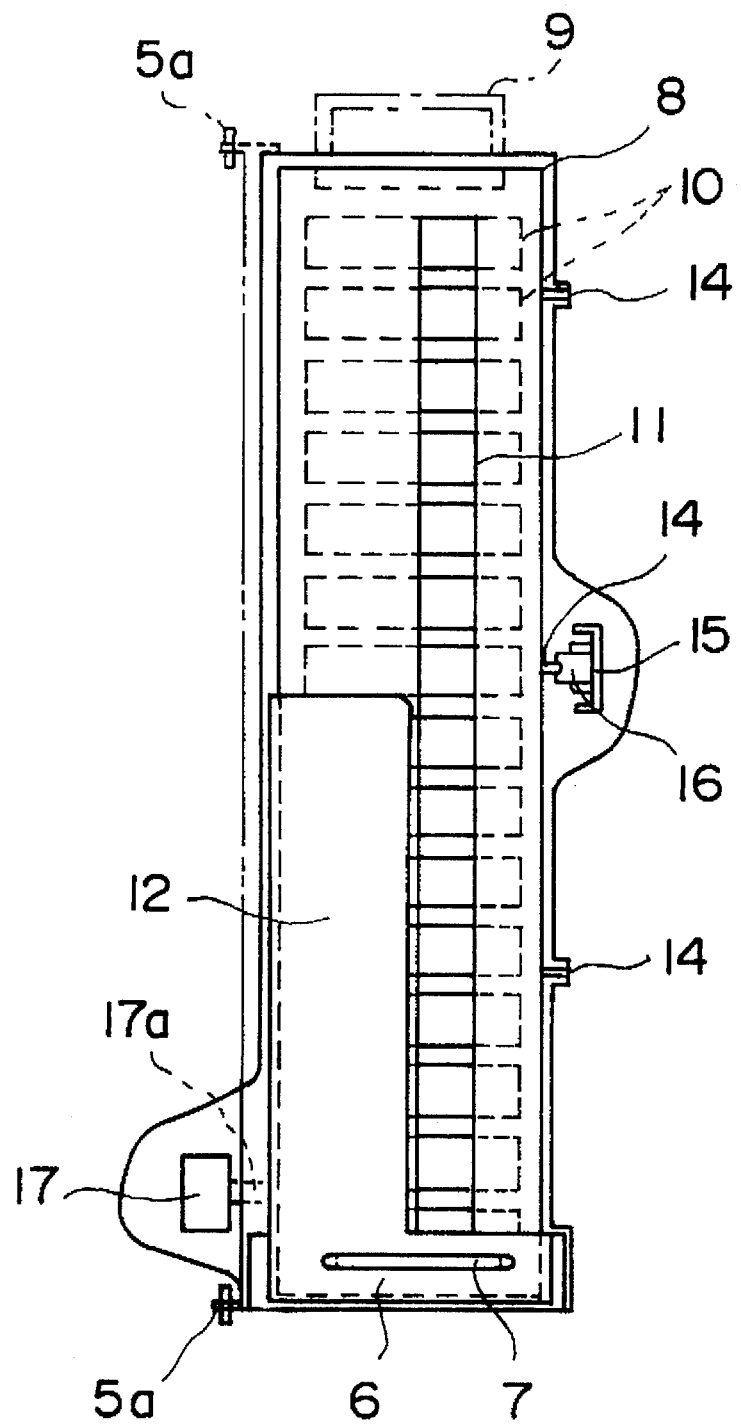
FIG. 3 is a front view showing the magazine accommodating portion as it contains a magazine in the apparatus according to the embodiment shown in FIG. 1.

A lateral side of the magazine 8 is equipped with a lug 14 in a position that corresponds to the height of each latch 15 when the magazine is placed on the sliding drawer 6. In FIG. 3, three lugs 14 are shown and only one latch 15 is shown in the position that corresponds to one of those lugs but it should be understood that a latch 15 is provided in association with each lug 14. When the magazine 8 on the sliding drawer 6 is slipped into the accommodating portion 1 through the opening 4, the lugs 14 will push the cam 16 so that it causes the relevant latch 15 to be displaced in such a direction that the safety cover 5 is brought out of engagement with all latches 15. Thus, the magazine 8 can be loaded as it pushes open the safety cover 5 in counteraction against the urging force of a spring, etc.

At the farthest (deepest) end of the opening 4 and in the position to be contacted by a lateral side of the magazine 8 as it is loaded, a solenoid-driven locking member 17a is provided in such a way that when a solenoid 17 is actuated in response to an operator's command, the locking member will project into engagement with a recess (not shown) formed in the lateral side of the magazine 8 which is loaded in the normal operative position, whereby the magazine can be securely fixed.

The cartridge library apparatus according to the embodiment under consideration may be operated in the following manner.

First, the sliding drawer 6 is pulled toward the operator and the magazine 8 carrying a plurality of cartridges 10 is slid down inward of the bracket 12. Then, the drawer 6 is pushed into the magazine holding portion 1, whereupon the lugs 14 on a lateral side of the magazine 8 are disengaged from the associated latches 15 via cam 16 so that the magazine, as its front pushes open the safety cover 5, is loaded at a predetermined operative position in the magazine holding portion 1. Then, the solenoid 17 is actuated in response to an operator's command, whereby the locking member 17a is brought into engagement with the lateral side of the magazine 8 so as to fix the latter.

With the loading of the magazine 8 being thus completed, cartridges 10 in the magazine 8 are in such a position that they can be transported by the transport mechanism 25. A bar code label (not shown) provided on each of the cartridges 10 in the magazine 8 or a bar code label that is furnished in the same grid position as each of the cartridges 10 held in the magazine is read as a cartridge identifying information with a bar code reader on the transport mechanism 25 and registered. Further, on the basis of the registered cartridge identifying information, the control unit determines both the position of the cartridge to be transferred and the position to which it should be transported and the transport mechanism 25 performs the necessary operations such as transferring successively the individual cartridges 10 to the main racks 2a or the magnetic tape drive unit 20 or returning the cartridges 10 from the main racks 2a or the tape drive unit 20 back to the magazine 8.

To take out the magazine 8 which is no longer necessary, the operator may repeat the loading procedure described in the preceding paragraphs except that the order of steps involved is reversed. Thus, the magazine 8 is pulled out of the accommodating portion 1 together with the sliding drawer 6 and as it contains a plurality of cartridges 10, the magazine 8 is carried away by the operator who holds the handle 9 on the top. The safety cover 5 insures that opening 4 is automatically closed after the magazine 8 is pulled out.

As described on the foregoing pages, the cartridge library apparatus of the embodiment under consideration insures that the magazine 8 as it contains a number of cartridges 10 can be loaded or unloaded in one operation. Hence, compared to the case where individual cartridges 10 have to be loaded or unloaded separately by the operator, not only the workload of the operator but also the time required to complete the job can be significantly reduced. As a consequence, the job efficiency of operations that involves handling a high volume of cartridges 10 such as processing files on a monthly or yearly basis can be improved markedly.

While the present invention has been described above with specific reference to the preferred embodiment, it should be understood that the invention is not limited to that particular embodiment and that various modifications can be made without departing from the scope and spirit of the invention.

Two major advantages of the present invention are as follows.

First, the cartridge library apparatus of the present invention enables a number of cartridges to be loaded, registered and unloaded in one operation using a simple mechanism and this helps reduce the workload of the operator who has to handle a high volume of cartridges.

Second, handling the cartridges as they are put in more than one magazine provides ease in their transport and storage, thereby proving to be very effective in data management on a job basis.

What is claimed is:

1. A cartridge library apparatus comprising:

(a) a plurality of racks in a housing configured to accommodate a plurality of cartridges of magnetic tapes;

(b) magazines for receiving said plurality of cartridges of magnetic tapes;

(c) a transport mechanism designed to slide along said racks and to transport said cartridges between a magnetic tape drive unit and said racks, said transport mechanism having direct access to said cartridges of magnetic tape in said magazines;

(d) a magazine rack composed of a portion of said plurality of racks having a first side accessible by said transport mechanism and a second side accessible from outside said housing which is operable to be loaded from the outside and unloaded from said racks by said transport mechanism;

(e) first openings in said plurality of racks facing said transport mechanism through which said cartridges of magnetic tape can be unloaded by said transport mechanism;

(f) second openings in said magazine rack provided on an outer wall of said housing through which said magazines can be loaded from outside the housing;

(g) a safety cover on each of said second openings configured to be urged from an open position to a closed position;

(h) a latch which locks the safety cover in the closed position and unlocks the safety cover by an operation of inserting one of said magazines from the second opening into the magazine rack; and (i) a sliding drawer onto which at least one of the magazines may be loaded and unloaded, the sliding drawer having a bottom portion configured to slide horizontally from an open position substantially outside one of the second openings to a closed position substantially inside one of the second openings, the sliding drawer including a securely fixed bracket positioned to contact a magazine loaded on the sliding drawer, from a bottom portion to a position on a lateral side which is located on the same level as a center of gravity of the magazine.

2. The cartridge library apparatus of claim 1, further comprising;

a plurality of main racks, composed of said plurality of racks other than said magazine rack having first sides accessible by said transport mechanism and second sides accessible from outside said housing and wherein said plurality of main racks and said magazines are configured so that said cartridges of magnetic tape are stacked in said main rack on a pitch substantially the same as the pitch of said cartridges of magnetic tape stacked in said magazines.

3. The cartridge library apparatus of claim 2, further comprising;

said magazines include information identifying a plurality of cartridges of magnetic tape which are to be stacked;

a means for reading said information located within said transport mechanism; and a transport control means for controlling the operation of said transport mechanism based on said information read by said reading means.

4. The cartridge library apparatus of claim 1, further comprising;

said magazines include information identifying a plurality of cartridges of magnetic tape which are to be stacked;

a means for reading said information located within said transport mechanism; and a transport control means for controlling the operation of said transport mechanism based on said information read by said reading means.

5. The library cartridge apparatus of claim 1, wherein said magazine rack is configured to permit magazines to be stacked in two rows disposed in a front side of said housing and accessible by said transport mechanism.

6. The library cartridge apparatus of claim 1, wherein said plurality of main racks are disposed on both sides of said magazine rack.

7. The library cartridge apparatus of claim 1, wherein said magazine rack is configured so that said first side accessible by said transport mechanism lies in a plane substantially the same as said first sides accessible by said transport mechanism of said main rack, thereby insuring that said cartridges in said magazine rack and said plurality of main racks can be handled equally by said transport mechanism.

8. The cartridge library apparatus of claim 1, further including a locking member positioned in the magazine rack to be selectively engaged with a lateral side of the magazine in the magazine rack.

9. The cartridge library apparatus of claim 8, further including a solenoid for driving the locking member.

10. The cartridge library of claim 1, wherein the safety cover engages at least one latch disposed on the side of the safety cover, and at least one cam designed to displace the latch.

11. The cartridge library of claim 10, wherein each of the magazine racks includes at least one lug positioned to contact the at least one cam when the magazine is loaded on the sliding drawer.

* * * * *